(12) United States Patent
Schlensker et al.

(10) Patent No.: US 6,936,084 B2
(45) Date of Patent: Aug. 30, 2005

(54) FILTER FOR THE SEPARATION OF CONTAMINANTS FROM GAS STREAM

(75) Inventors: Herbert Schlensker, Leverkusen (DE); Johannes Sinstedten, Korschenbroich (DE)

(73) Assignee: Beko Technologies GmbH (DE)

( * ) Notice: Subject to any disclaimer, the term of this patent is extended or adjusted under 35 U.S.C. 154(b) by 168 days.

(21) Appl. No.: 10/399,812

(22) PCT Filed: Jun. 11, 2001

(86) PCT No.: PCT/DE01/02168

§ 371 (c)(1), (2), (4) Date: Apr. 23, 2003

(87) PCT Pub. No.: WO02/38247

PCT Pub. Date: May 16, 2002

(65) Prior Publication Data

US 2004/0035097 A1 Feb. 26, 2004

(30) Foreign Application Priority Data

Oct. 23, 2000 (DE) ........................ 100 52 524

(51) Int. Cl.[7] .............................. B01D 27/08
(52) U.S. Cl. ............................. 55/321; 55/324; 55/325; 55/330; 55/498; 55/502; 55/514; 210/493.1; 210/493.2; 210/493.5; 210/352; 210/450
(58) Field of Search .................. 55/321, 324, 325, 55/330, 498, 502, 514; 210/493.1, 493.2, 493.5, 450, 352

(56) References Cited

U.S. PATENT DOCUMENTS

| 6,039,885 | A | * | 3/2000 | Behar et al. | 210/767 |
| 6,398,037 | B1 | * | 6/2002 | Sadan et al. | 210/352 |
| 6,540,914 | B1 | * | 4/2003 | Smith | 210/297 |
| 6,666,968 | B2 | * | 12/2003 | Smith et al. | 210/254 |
| 6,723,149 | B2 | * | 4/2004 | Ernst et al. | 55/498 |
| 6,770,110 | B1 | * | 8/2004 | Seifert et al. | 55/498 |

* cited by examiner

Primary Examiner—Duane Smith
Assistant Examiner—Minh-Chau T. Pham
(74) Attorney, Agent, or Firm—Akerman Senterfitt

(57) ABSTRACT

A filter for separating contaminants from a gas stream, including (a) a housing having a housing body and a housing head, the housing head having an inlet for the gas stream to be purified, an outlet and a first sealing surface, and (b) a filter element accommodated in the housing, having an element head and an element body having a central element axis and an element interior. The element head has a second sealing surface which cooperates with the first sealing surface. A curved inlet manifold is formed between the inlet and the element interior. The inlet manifold is embodied partly in the housing head and partly in the element head such that the first and second sealing surfaces contact in a sealing plane at a 90° to 60° angle to the element axis. A radially arranged seal is provided on the sealing plane, forming one of the sealing surfaces.

12 Claims, 4 Drawing Sheets

Figure 1:
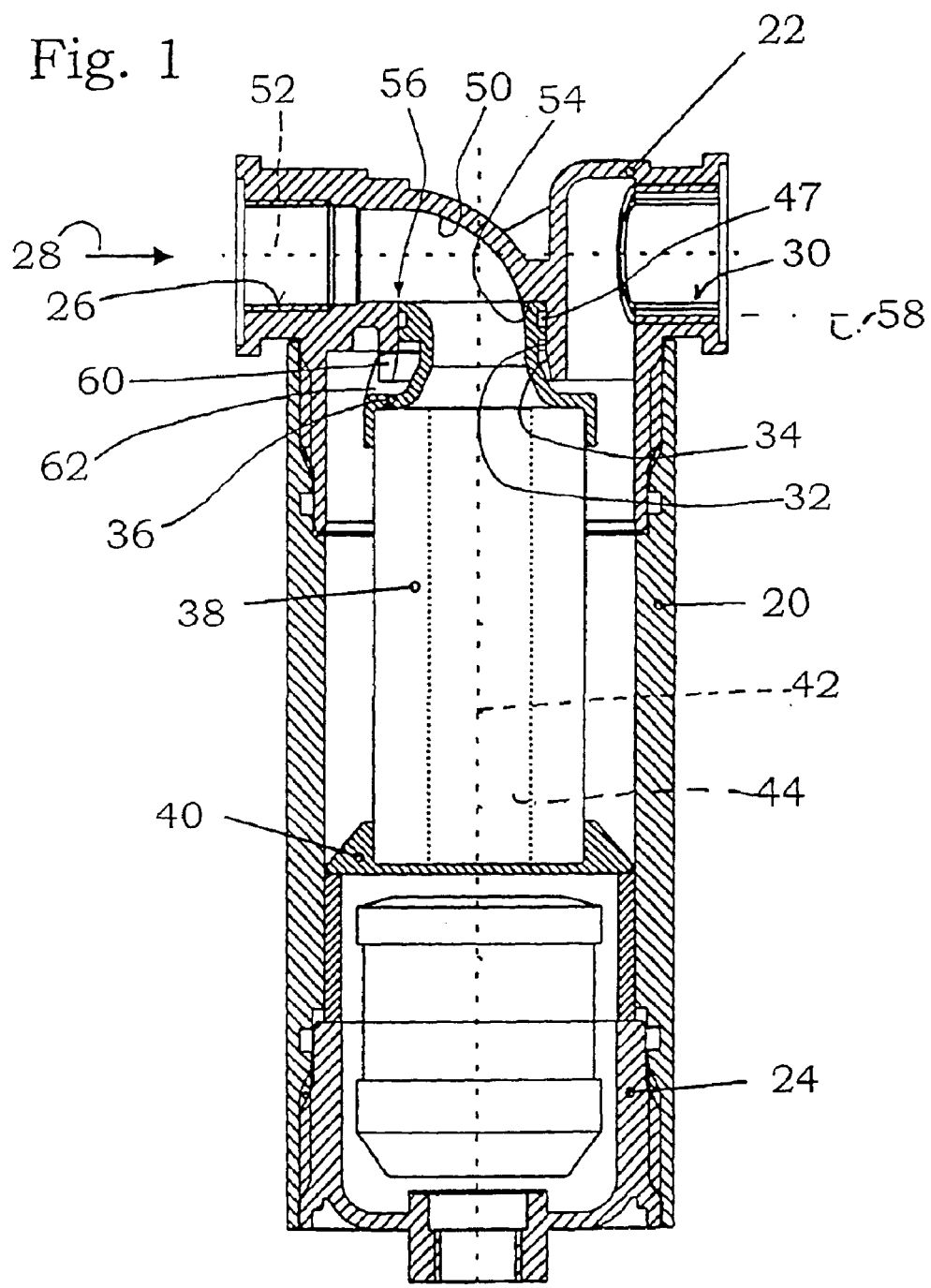

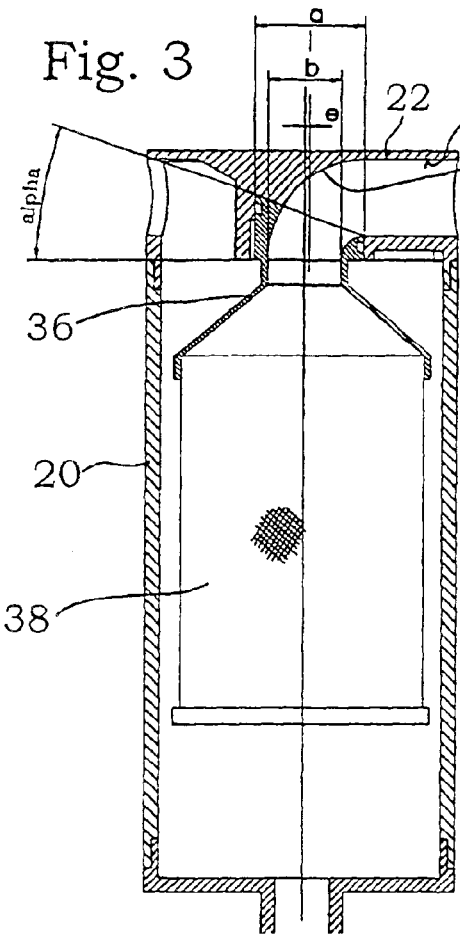
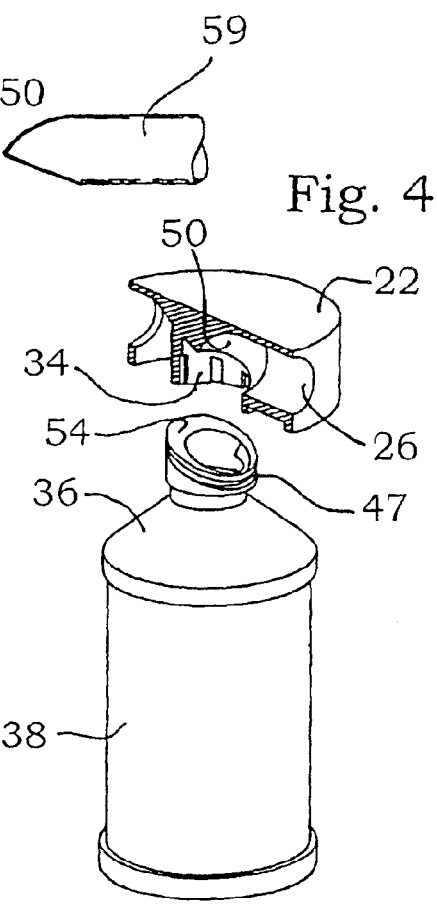
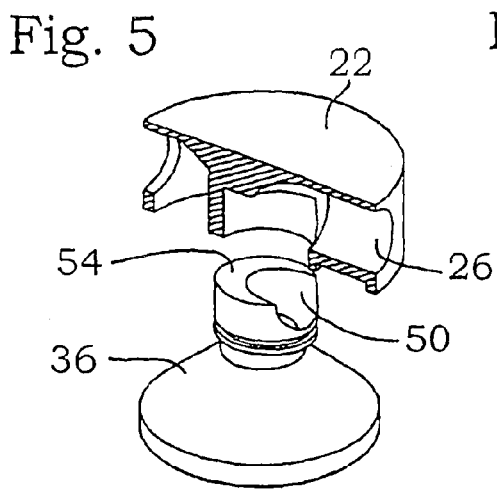
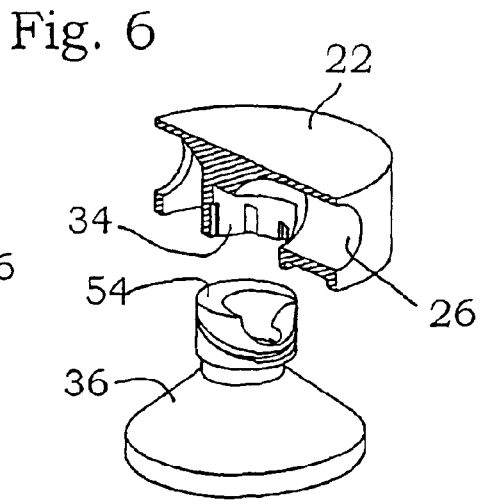

FILTER FOR THE SEPARATION OF CONTAMINANTS FROM GAS STREAM

FIELD OF THE INVENTION

The invention relates to a filter for separating impurities from a gas stream with a) a multi-piece housing, said housing having a housing body portion and a housing head portion, the housing head portion having an inlet for the gas stream to be cleaned and an outlet, and the housing head portion having further a first sealing surface, and b) with a filter element accommodated within said housing, said filter element having an element head and a tubular element body which element body has a central element axis and an element inner volume, said element head having a second sealing surface that releasably cooperates with the first sealing surface and a curved inlet elbow being configured between the inlet and the element inner volume.

BACKGROUND OF THE INVENTION

Such a filter is known from WO 99/30799. In this previously known filter, the element head forms the complete inlet elbow. It is immediately adjacent to the inlet. Accordingly, the housing head portion does not contribute to form the inlet elbow. The first sealing surface configured within the housing head portion is virtually perpendicular to the element axis, the same applies to the second sealing surface. The second sealing surface is formed by a sealing ring that acts in the axial direction. It cannot be ruled out that said ring is subjected to such a load during insertion that it slips out of its holding device. A mechanical guide is further necessary, said guide causing the second sealing surface to fit precisely relative to the first sealing surface and concurrently these two sealing surfaces to be pressed together during insertion.

Another disadvantage of the previously known filter is that a differential pressure measurement between inlet and outlet is difficult. In the document mentioned, the inlet elbow has a special connecting sleeve for detecting the pressure inside the inlet elbow. This makes the mechanical implementation complicated and the additional sealing requires special provisions.

The element head with its inlet elbow is also difficult to manufacture. Natural methods for removing the mould cannot be used here. Furthermore, the filter element becomes more bulky on account of the relatively large element head. As is known, the filter element is intended to wear and be replaced after a certain number of hours operation.

BRIEF SUMMARY OF THE INVENTION

It is the object of the invention to thoroughly develop the previously known filter so that it is easier to manufacture and more convenient to use in practice while still maintaining the advantages of an already well known inlet elbow with smooth inner surfaces.

In view of the filter of the type mentioned herein above, this objective is accomplished by configuring part of the inlet elbow inside the housing head portion and part of it in the element head, by having the first sealing surface and the second sealing surface meeting in a sealing plane that is inclined at an angle of between 90. degree. and 60. degree., preferably at an angle of between 90. degree. and 70. degree., to the element axis, and by providing for a radially disposed seal in said sealing plane, said seal forming one of the two sealing surfaces.

The housing head portion of this filter can be conveniently manufactured by casting, e.g., by injection moulding or by die casting. The element head too is easy to produce, more specifically by plastic injection moulding or the like. The invention provides the advantage that it permits to obtain, with a simple manufacturing process, a smooth inlet elbow the exact conformation of which is not predetermined. The element head engages in a bore for receiving the housing head portion and fills it so as to form the inlet elbow. The oversize of the receiving bore is dimensioned in such a manner that, starting with the inlet and that part of the inlet channel which is located therebehind, the receiving bore and the recess oriented crosswise thereto can be made in shaping them in a simple mould. For this purpose, the element head is preferably configured in such a manner that it adopts the entire curved shape on the shortest flow path. The longest flow path is thereby substantially formed by the inner wall of the housing head portion. As a result thereof, the receiving bore and that part of the inlet elbow that belongs to the housing head portion can be formed by two cores which can be removed from the mould by natural processes. Whereas one core can be stationary within the hollow mould, the other core needs only be made slidable along a linear trajectory. Complicated core movements, on a curved trajectory for example, are not necessary.

As part of the inlet elbow is formed by the housing head portion, a pressure measurement may be carried out on the housing head portion. As a result thereof, differential pressure measurement is easy and may be carried out as is customary according to the prior art.

As the seal used is disposed radially, it is much less likely that a sealing ring be cut off. The seal is easier to implement. The glide paths of a sealing ring relative to another sealing surface are shorter. As contrasted with a seal acting in an axial direction, no special provisions are needed for achieving that the sealing ring be pressed against an opposing sealing surface, the mechanical pressures acting on the sealing ring being rather balanced altogether.

In a preferred embodiment the sealing surface is oriented at an angle greater than 90. degree. to the element axis. As a result, it is inclined relative to the element axis. This has proved efficient in providing a good sealing. An angle of inclination of the sealing surface to the element axis of 83. degree. is particularly convenient. With such an inclined sealing surface, a sealing ring comes into contact with the associated first sealing surface at one site first during insertion of the filter element into the housing head portion. Only later will the sealing ring come into ever increasing contact with the associated first sealing surface of the housing head portion. This also corresponds to the normal process taking place during insertion into a bore of a seal acting in a radial direction. One avoids to place the entire sealing ring onto the bore and rather tilts said ring at the beginning of the insertion. The force applied during insertion is thus prevented from being stepped, insertion errors are avoided.

In a preferred development the inlet elbow is only formed by the inner volume of the housing head portion inasmuch as said inner volume is defined by a rigid core that may be introduced in a linear motion through the inlet. The other parts of the inlet elbow are formed by the element head. As a result, the element head can be readily manufactured by injection moulding.

In a preferred embodiment, element head and housing head portion are joined along a parting line that is provided at a distance from the sealing plane and is offset relative to the inlet as viewed from said sealing plane. Further, the inlet elbow has the smoothest possible curve in the region of said parting line. The transition from the part of the inlet elbow formed by the housing head portion to the part of the inlet elbow formed by the element head takes place at said parting line. It is advantageous to have the housing head portion and the element head meeting at the parting line so as to form a step. A clearly defined stop is thus achieved. It is avoided that housing head portion or element head have tapering parts that can be readily damaged.

In a preferred development the element head has a flare at the site where it merges into the element body. This flare performs the function of a diffuser. As a result thereof, a convenient flow distribution toward the inner volume of the element takes place.

It is particularly preferred to implement a first positioning means on the element head and a second positioning means on the housing head portion, said second positioning means cooperating with the first positioning means. As the filter element is being introduced into the housing head portion, the two positioning means come into contact before the first sealing surface touches the second sealing surface. This facilitates the insertion of the filter element in the housing head portion. A wrong orientation of the filter element relative to the housing head portion cannot lead to a wrong insertion. The two guide means are designed in such a manner that the element body can be introduced completely into the housing head portion in a certain position of rotation only. At this point it should be emphasized once more that, just as with the prior art cited herein above, the filter element cooperates with the housing head portion in a certain position of rotation only.

The filter according to the invention is intended to separate any kind of impurities from a streaming gas. The impurities may be solids or fluids. The gas stream can be a gas mixture. The gas more specifically suited is air. The filter is more specifically configured as a compressed gas filter, preferably as a compressed air filter.

DETAILED DESCRIPTION OF THE DRAWINGS

Figure 2:
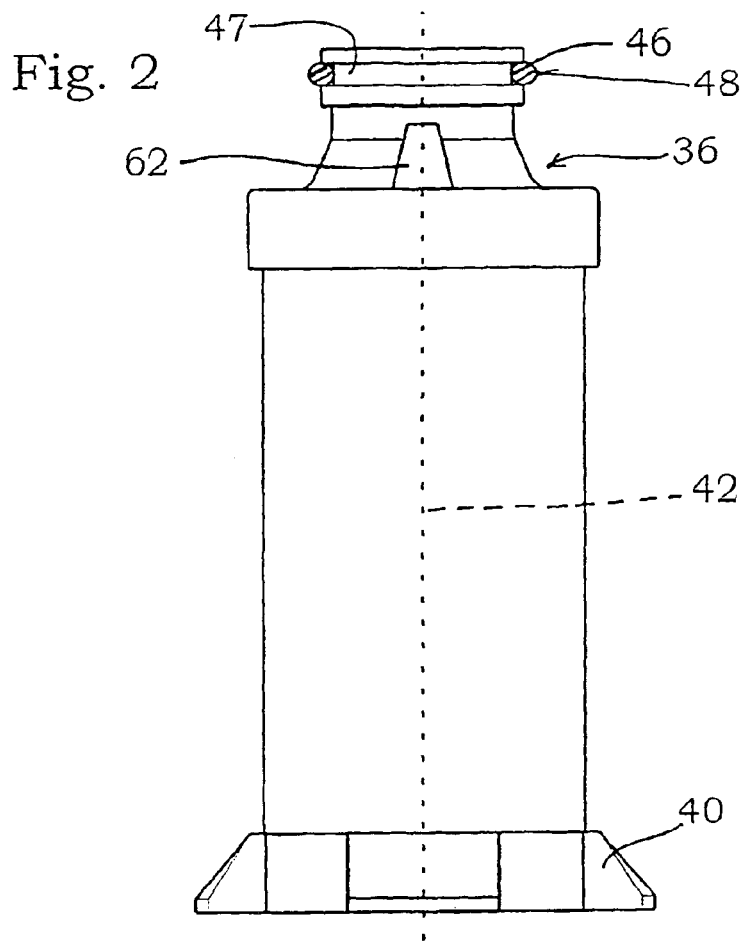
Figure 9:
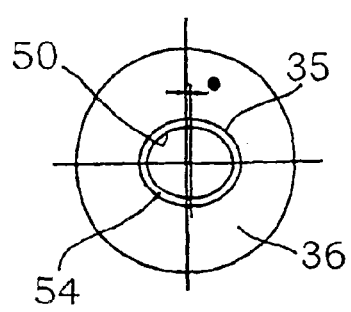
Figure 10:
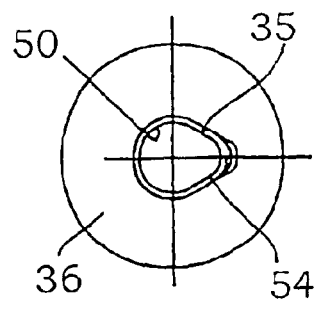
Figure 11:
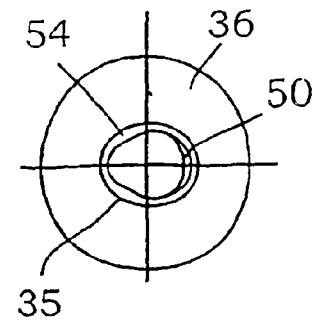
Figure 7:
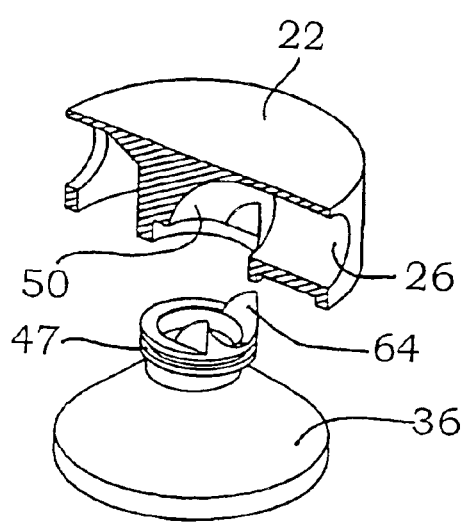
Figure 8:
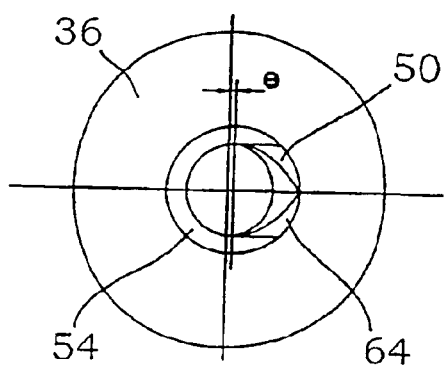
Figure 12:
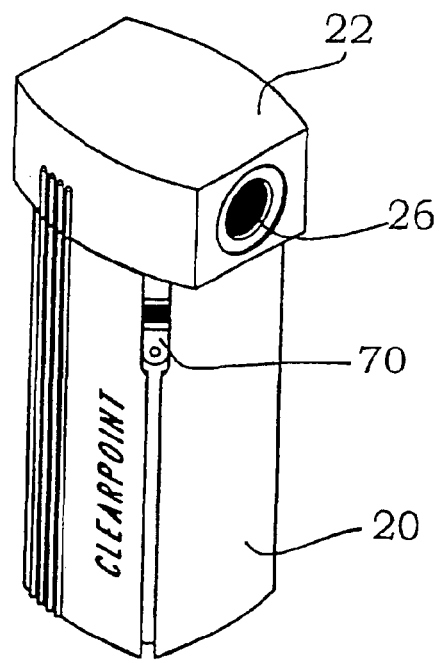
Figure 13:
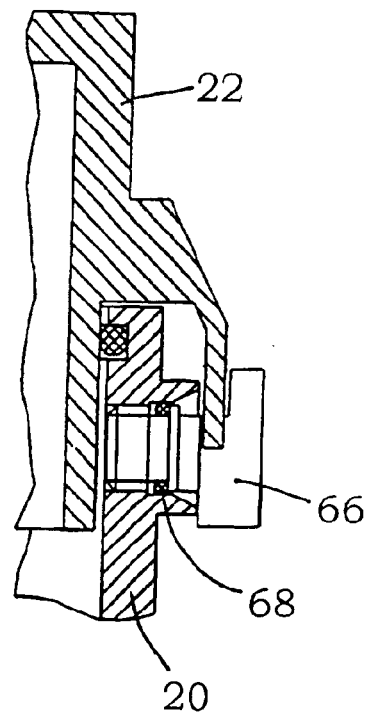

Further advantages and characteristics of the invention will become apparent from the other claims and from the following non restrictive description of embodiments thereof, given by way of example only with reference to the drawing in which:

FIG. 1 shows a sectional view of a filter with a cutting plane passing through a central element axis of a filter element, FIG. 2 is a side view of a filter element in a position turned a 90 degree angle as compared to the illustration of FIG. 1, FIG. 3 is a sectional view of a filter in a sectional illustration as in FIG. 1, but now with a sealing plane that is inclined at an angle of about 70. degree. to the central element axis, FIG. 4 is a perspective view of the filter element of FIG. 3 and, like in FIG. 3, of a housing head portion located thereabove, but shown in a sectional view along a diametral plane, FIG. 5 is a perspective view similar to FIG. 4 with an upper portion of a filter element and with a housing head portion located thereabove which again is shown in a sectional view, FIG. 6 is an illustration according to FIG. 5 of another embodiment, FIG. 7 is an illustration according to FIG. 5 of still another embodiment, FIG. 8 is a top view of the element head of the filter element according to FIG. 7, FIG. 9 is a top view similar to FIG. 8 for another embodiment, FIG. 10 is a top view according to FIG. 8 for another embodiment, FIG. 11 is a top view according to FIG. 8 on another embodiment, FIG. 12 shows an external side view of the filter and FIG. 13 is a sectional view through a locking element as it can be utilized in the embodiment according to FIG. 11.

DETAILED DESCRIPTION OF THE INVENTION

As can be surveyed from FIG. 1, the filter has a multi-piece housing. The housing has a housing body portion 20, a housing head portion 22 and a housing bottom portion 24. The housing head portion 22 is provided with an inlet 26 for the gas stream to be cleaned, see arrow 28, and with an outlet 30. The outlet must not necessarily be formed within the housing head portion. The housing head portion 22 further has a first sealing surface 32 which in the present case is formed by a portion of the inner wall of a cylindrical receiving bore 34.

The housing accommodates a filter element. It has an element head 36, a tubular element body 38 and an element bottom 40. Beneath the element bottom 40 there is room for an additional device such as a condensate drain device.

The element body 38 has a central element axis 42 and an element inner volume 44 which is cylindrical and centered on the element axis 32.

The element body 38 may be any configuration. Oval-shaped element bodies, element bodies with a star-shaped cross-section and so on may be utilized. The element head must be suitably adapted, though.

In its upper portion, the element head 36 has a groove 47 for a sealing ring 46, said groove being radially accessible from the outside. FIG. 2 shows the inserted sealing ring 46. Its outer surface forms a second sealing surface 48 that is in sealing contact with the first sealing surface 32 (FIG. 1).

The flow path from the inlet 26 to the inner volume 44 of the element comprises an inlet elbow 50 provided with the smoothest possible inner walls. Said inlet elbow 50 is intended to lead, as conveniently as possible from a fluidic point of view, the gas stream entering the inner volume 44 of the element in the direction indicated by the arrow 28 and is in any case intended to contribute to provide convenient flow.

According to an important feature of the invention, said inlet elbow 50 is formed by the housing head portion 32 on the one hand and by the element head 36 on the other hand. It can be surveyed from FIG. 1 that the shortest flow path of the inlet elbow is formed by surfaces of the element head 36 only, these surfaces being located in FIG. 1 above and to the right of the left portion of the sealing ring 46. By contrast, the major part of the longest flow path of the inlet elbow 50 is formed by the housing head portion. A small portion of the curve of the longest flow path only is formed by parts of the element head 36, said parts being located to the left of the right portion of the sealing ring 46 this time. Accordingly, the overall inlet elbow is formed both by parts of the housing head portion 22 and by parts of the element head 36.

The term inlet elbow 50 designates that part of the overall inlet channel that has curved inner walls. Those portions of the inlet channel that are not curved do not belong to the inlet elbow 50.

For easy removal of the housing head portion from the mould, the axial line of the receiving bore 34 is offset relative to the element axis 42. The offset is in the direction of the inlet 26. As a result thereof, the inner radius of the inlet elbow 50 is formed by the element head 36 only. At the site of the smallest flow path, the receiving bore 34 extends so far toward the inlet 26 that the housing head portion 22 has no curve on the line of the shortest flow path. The receiving bore 34 has one surface line that is closer to the inlet 26 than all the other surface lines of the receiving bore 34. In the embodiment according to FIG. 1, said surface line lies in the entry plane of the inlet elbow 50. In general, the construction is selected independent of the shape of the receiving bore and is such that the surface line closest to the inlet 26 does not cut the inlet elbow 50 but rather passes, in the prolongation thereof, through a region of the inlet channel in which the inner walls thereof are parallel to an inlet axis 52.

At the site of the longest flow path the receiving bore 34 also protrudes beyond the cross section of the inlet elbow 50. The associated surface line of the receiving bore 34 which is closest to the outlet 30 is offset toward the outlet relative to the clear opening of the inlet elbow 50. A step 54 is thus formed. This step 54 is not necessary for removing the mould. It rather permits to obtain a parting line 56 and a defined, precise transition between element head 36 and housing head portion 22. The step 54 forms a defined stop as the element head 36 is being introduced into the housing head portion 22, meaning during the insertion of the filter element.

As can be surveyed from FIG. 1, the upper end of the element head 36 lies in a plane. The step 54 lies in this plane as well. The step 54 is defined by two circles that are off-center relative to one another. An outer circle has the diameter of the receiving bore 34. An inner circle has the diameter of the inlet elbow 50 at the exit site of the housing head portion 22. These two circles meet at the locations nearest to the inlet 26. Accordingly, the step 54 is widest where it is most remote from the inlet 26 and has a width 0 where it is closest to the inlet 26.

It is not necessary that the step 54 lie in a plane, this will become apparent from the other exemplary embodiments. The step 54 is nearer to the inlet 26 than a sealing plane 58 in which the first sealing surface 32 and the second sealing surface 48 meet. In the exemplary embodiment according to FIG. 1, both the plane of the step 54 and the sealing plane 58 are oriented at an angle of 90. degree. to the element axis 42.

The element head 36 surrounds the upper rim of the element body 38 with an outer collar. The inner channel thereof flares toward the inner volume 44 of the element and is configured to form a diffuser in the present case.

The housing body portion 20 is connected to the housing head portion 22 by a screw thread. Said screw thread is a double lead thread. The two leads are offset 180. degree. This makes it possible to provide the housing body portion 20 with a front surface that is not only located on the front when the inlet 26 points to the left like in FIG. 1 but also when the inlet 26 points to the right.

To facilitate the introduction of the filter element into the opened housing and to make finding of the right position of the filter element relative to the housing head portion 22 more easy during insertion, guide means are provided. The housing head portion 22 has a first guide means. At a collar of the housing head portion 22 that protrudes downward and extends around the lower end of the receiving bore 34 a notch is provided. A matching second guide means 62 is configured on the element head 36. This means can be more specifically surveyed from FIG. 2. It is a rib that extends radially outward and is axially oriented.

During insertion of the filter element in the housing head portion 22, the second guide means 62 abuts on a lower, peripheral rim of the collar of the housing head portion 22 if the orientation is wrong. The filter element can only be introduced into the housing head portion 22 at the location where said peripheral rim is provided with the first guide means 60, meaning with the notch.

The guide means 60, 62 are illustrated and described by way of example only. It is left to those skilled in the art to find other mechanical solutions. A solution is preferred that permits to achieve guidance and positioning even before the top free end of the element head 22 is allowed to enter in contact with the receiving bore 34. In this case, the guide means are configured in such a manner that they force the element head 36 into the receiving bore 34. A flared configuration is advantageous. The first guide means 60 can already be configured on the inner wall of the housing head portion opposing that thread that is intended for connection with the housing body portion 20.

The exemplary embodiment according to the FIGS. 3 and 4 substantially coincides with the implementation discussed herein above. Like elements will bear the same reference numerals as in the first exemplary embodiment throughout the following exemplary embodiments. The differences will be discussed below:

In the configuration according to the FIGS. 3 and 4, the sealing plane 58 is now inclined at an angle different from 90. degree. to the element axis 42. The actual angle amounts to approximately 70. degree. The step 54 lies now also in a plane that is inclined to the element axis 42 at the same angle as the sealing plane 58. The angle is labeled alpha in FIG. 3.

Again, there is eccentricity. It is indicated by the letter e, the axis of the receiving bore 34 is offset toward the inlet 26 by the dimension e relative to the inside diameter of the inlet elbow 20 at its lowest site, said diameter being indicated at b. The receiving bore 34 has the diameter a. The inner wall of the entire inlet elbow is smooth like in the implementation according to the FIGS. 1 and 2.

FIG. 3 also shows a core 59 of a mould that has not been illustrated in greater detail herein. It is located in front of inlet 26. It only needs to be moved linearly, along the inlet axis. It serves to shape that part of the inlet elbow 50 that is located within the housing head portion.

As will become apparent from the following exemplary embodiments, the invention makes it possible to vary different parameters. One parameter may thereby be varied independent of the variation of another parameter, this applies to a plurality of parameters in any case. The parameters include for example the free inside cross section of the inlet elbow. In this case, the cross section needs not be circular all over as it is the case in the already discussed exemplary embodiments. The cross section may rather be varied ad lib. It may be circular at the beginning, then change to an ellipse and become circular again. Any configuration is possible. Here, the way to achieve a most convenient flow can be taken into consideration.

A parameter that may also be varied is the cross sectional shape of the receiving bore 34; this can occur largely independent of the shape of the inlet elbow 50. The receiving bore 34 can have a cross section with a polygon shape, it may be any shape out of round.

Other parameters that may be changed are the positions of the sealing plane 58 and the parting line 56. The parting line needs not necessarily lie in a plane. The sealing plane 58 needs not necessarily be a plane, it can rather have any surface orientation. A completely surrounding sealing line is always provided, though. The sealing line can also be undulated. It may lie on a curved surface.

The embodiment according to FIG. 5 shows an example in which a sealing line is inclined at an angle of 90. degree. to the element axis 42 and lies on a sealing plane 58. The parting line 56 is in part spaced at a greater distance from the sealing plane 58 than in the exemplary embodiments discussed herein above. It more specifically is not oriented in a plane. For its major part it has a plane orientation which then becomes approximately parabolic, which parabolic curve is inclined relative thereto.

Unlike the embodiment shown in FIG. 5, the embodiment according to FIG. 6 has a sealing plane 58 that is no longer perpendicular to the element axis 42 but inclined at an angle thereto. A preferred angle is 83. degree. In the embodiment according to FIG. 6 the angle is approximately 70. degree. Again, a relatively large part of step 54 is perpendicular to the element axis 42, a parabolic, inclined portion extending as a continuation thereof.

In the embodiment according to FIG. 7 the sealing plane 58 is perpendicular to the element axis 42. The same applies to the step 54 on the major part of the surface thereof. Additionally equalizing bodies 64 protrude from the step 54 upward, said equalizing bodies fitting in recesses of the housing head portion 22 associated thereto. A smooth inner wall of the inlet elbow 50 is thus formed altogether. Thanks to said equalizing bodies 64 the housing head portion 22 can be manufactured without undercuts by the moulding technique. In the embodiment according to FIG. 7 the parting line 56 has an orientation that is substantially defined by a semicircle and then by boundaries of the equalizing bodies 64.

FIG. 8 shows a top view of the element head 36 according to FIG. 7. The excentricity is shown, which again is indicated at e. The orientation of the parting line 56 can be seen. The step 54 can be surveyed.

The embodiments according to the FIGS. 9, 10 and 11 show differing element heads 36. An outer contour 35 shows the orientation of the associated receiving bore 34. Further, the inside cross section of the inlet channel in the region of the inlet elbow 50 can be distinguished. FIG. 9 shows the two boundary lines having a substantially elliptic shape. In FIG. 10 there is shown a greater departure from the round configuration, the shape is approximately ovoid. In FIG. 11, the ovoid shape of FIG. 10 is turned 180. degree.

FIG. 11 is a view of a completed, assembled filter. A locking device is provided on said filter. It is intended to prevent the housing body portion 20 from being screwed off the housing head portion 22 without a pressure prevailing inside the housing being lowered or without warning. For this purpose, the locking device is intended to create a connection between the inner volume of the housing and the outside prior to allowing the housing body portion 20 to be detached from the housing head portion 22. The locking device mechanically locks the connection between the housing body portion 20 and the housing head portion 22 and allows the two to be separated only after a pivot movement first compulsorily opens the interior of the housing so that it is in communication with the outside, allowing the housing body portion 20 to be detached only thereafter.

In FIG. 12 there is provided a bolt 70 that covers an opening in the wall of the housing body portion 20 in first position on the one hand and that simultaneously mechanically takes hold of the housing head portion 22 so as to provide a positive fit therewith on the other hand. Pushed to its open position, compressed air may exit, but the mechanical lock is also released.

FIG. 13 shows another locking device. It has a turning knob 66 that is rotatably mounted in the housing body portion 20, in a thread having a relatively large pitch. It positively engages a recess of the housing body portion 20. As a result thereof, housing body portion 20 and housing head portion 22 cannot be moved relative to one another. If the turning knob 66 is rotated, a seal 68 connected thereto is released from a sealing seat configured within the housing body portion 20. The threaded bore that accommodates the turning knob 66 opens into the inner volume of the housing. In releasing the seal 68, the inner volume of the housing is brought into communication with the outer space. The compressed gas exits the housing under a whistle. This whistle warns the operator. He now knows that he is doing something wrong if he still proceeds with the opening process and more specifically if he unscrews the housing body portion 20 from the housing head portion 22.

Other embodiments of the locking device can be provided. The locking device may also be configured as a rocker for example, which functions in a way similar to that of a bolt.

Such type locking devices are more specifically suited for a screw connection between the housing body portion 20 and the housing head portion 22. By contrast, a bayonet coupling between the two parts can be implemented in such a manner that separation is not possible as long as an internal pressure prevails in the system.

The housing body portion 20 is preferably implemented as an extruded profile. For this purpose, a tubular body with any exterior cross section is made which is then cut to the suited length.

It is also possible to describe the angular position of the sealing line and of the parting line 56 relative to the inlet axis 52. They are inclined at an angle of between 0 and 20. degree., preferably at an angle of 7. degree.

The part of the element head 36 that is located above the sealing line may be any shape and may be crowned, truncated, and so on.

What is claimed is:

1. A filter for separating impurities from a gas stream, the filter comprising:
   a) a multi-piece housing, said housing having a housing body portion and a housing head portion, the housing head portion having an inlet for the gas stream which gas stream is to be cleaned and an outlet, and the housing head portion having further a first sealing surface; and
   b) a filter element accommodated within said housing, said filter element having an element head and a tubular element body which element body has a central element axis and an element inner volume, said element head having a second sealing surface releasably cooperating with the first sealing surface and a curved inlet elbow being configured between the inlet and the element inner volume,
   wherein part of the inlet elbow is configured inside the housing head portion and part of the inlet elbow is configured in the element head,
   wherein the first sealing surface and the second sealing surface meet in a sealing plane inclined at an angle of between 90 degrees and 60 degrees to the element axis, and wherein a radially disposed seal is provided in said sealing plane, said seal forming one of the first and second sealing surfaces.

2. The filter of claim 1, wherein the sealing surface is inclined at an angle less than 90 degrees to the element axis.

3. The filter of claim 1, wherein the inlet elbow is at the most formed by an inner volume of the housing head portion, said inner volume being formed and defined by a rigid core introduced on a linear path through the inlet.

4. The filter of claim 1, wherein the housing head portion is provided with a receiving bore for the element head communicating with the inlet and oriented substantially crosswise to said inlet.

5. The filter of claim 1, wherein the element head and the housing head portion meet along a parting line spaced from the sealing plane and offset relative to the inlet as viewed from the sealing plane and wherein the orientation of the inlet elbow in the region of said parting line is the smoothest possible.

6. The filter of claim 1, wherein the element head has a transition zone toward the element body, a flare being provided in the transition zone toward the element body.

7. The filter of claim 1, wherein a first positioning means is provided on the element head and wherein a second positioning means is provided on the housing head portion, said second positioning means cooperating with said first positioning means, and wherein the first and the second positioning means come into contact as the filter element is being inserted into the housing head portion, whereby the positioning of the filter element within the housing head portion is determined before the first sealing surface meets the second sealing surface.

8. The filter of claim 1, wherein the seal has a contour, the contour being one of round, non round, and non round in the form of an oval or elliptic contour.

9. The filter of claim 1, wherein a step is configured within the housing head portion, said step extending at least over a partial range of 360 degrees, a front surface of the element head abutting on the step when the filter element is being introduced into the housing head portion.

10. The filter of claim 1, wherein the angle is between 90 degrees and 70 degrees to the element axis.

11. The filter of claim 1, wherein the angle is an angle of 83 degrees to the element axis.

12. The filter of claim 1, wherein the angle is an angle of less than 85 degrees to the element axis.

* * * * *